No. 872,062. PATENTED NOV. 26, 1907.
W. J. HILLIARD.
FRICTION CLUTCH.
APPLICATION FILED JULY 27, 1907.

2 SHEETS—SHEET 1.

WITNESSES:

INVENTOR
William J. Hilliard
BY
Eugene Niven
ATTORNEY

No. 872,062. PATENTED NOV. 26, 1907.
W. J. HILLIARD.
FRICTION CLUTCH.
APPLICATION FILED JULY 27, 1907.

2 SHEETS—SHEET 2.

WITNESSES:
A. S. Diven
M. E. Verbeck.

INVENTOR
William J. Hilliard
BY
Eugene Diven
ATTORNEY

UNITED STATES PATENT OFFICE.

WILLIAM J. HILLIARD, OF ELMIRA, NEW YORK, ASSIGNOR TO THE HILLIARD CLUTCH MACHINERY COMPANY, OF ELMIRA, NEW YORK, A CORPORATION OF NEW YORK.

FRICTION-CLUTCH.

No. 872,062.　　　　Specification of Letters Patent.　　　　Patented Nov. 26, 1907.

Application filed July 27, 1907. Serial No. 385,778.

*To all whom it may concern:*

Be it known that I, WILLIAM J. HILLIARD, a citizen of the United States, residing at Elmira, in the county of Chemung and State of New York, have invented certain new and useful Improvements in Friction-Clutches, of which the following is a specification.

This invention relates to improvements in friction clutches of the disk type, my object being to provide a clutch of this character which will be simple, compact, and powerful, and which will operate equally well at both high and low speeds.

A further object is to avoid the use of arms and levers in the setting up and release mechanism, thereby eliminating the effects of centrifugal force in operating the clutch at high speeds; and a final object is to provide the clutch with a friction ring and gripping disks so arranged and operated as to be set up gradually with a powerful grip, and to be quickly released, all with a minimum of effort.

I attain my objects by constructing the clutch in the manner illustrated in the accompanying drawings, in which—

Figure 1:
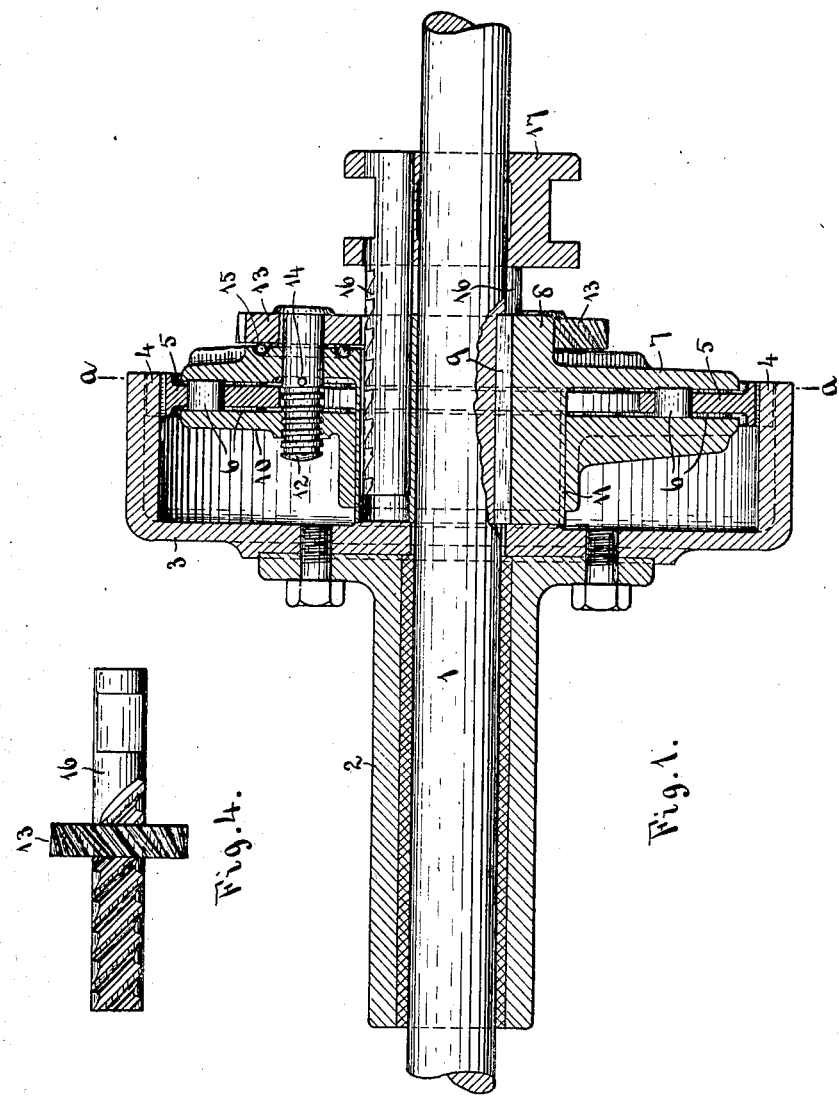
Figure 2:
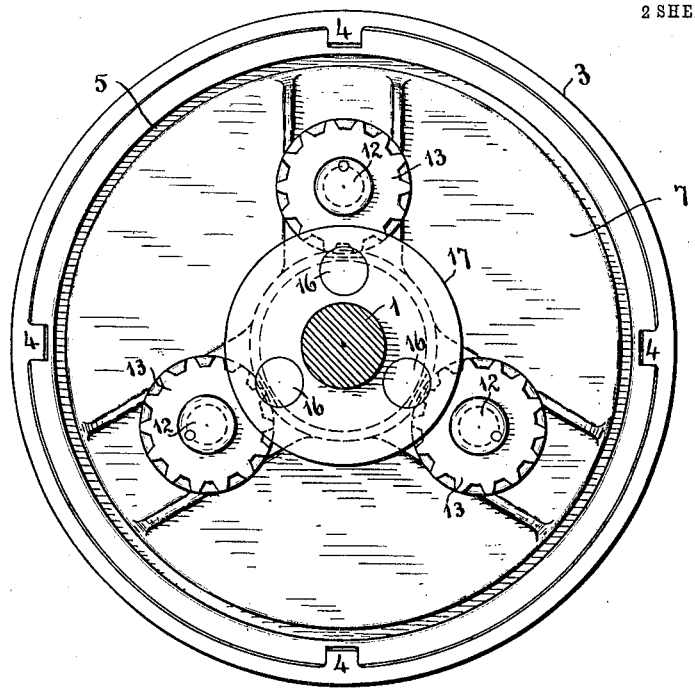
Figure 3:
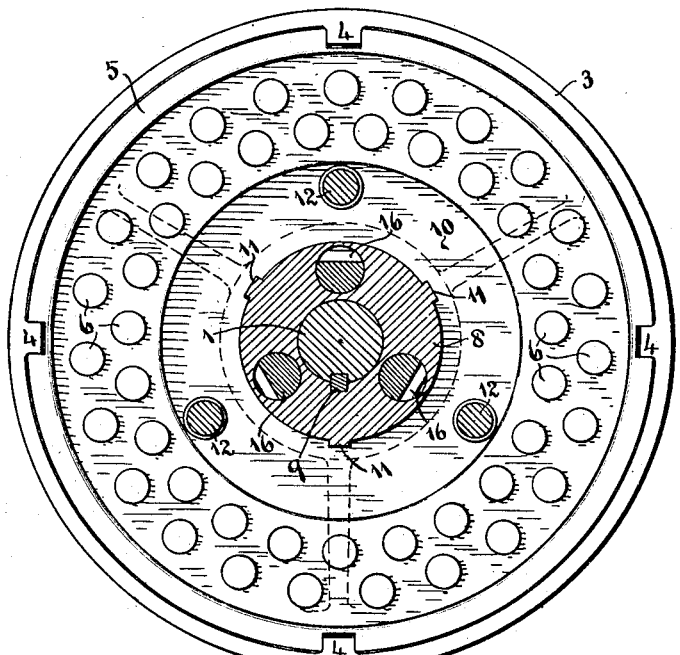

Figure 1 represents a longitudinal section through the clutch; Fig. 2, an end view, looking to the left in Fig. 1; Fig. 3, a transverse section on the line *a—a* in Fig. 1; and Fig. 4, a detail of the spiral gear and rack, which constitutes the operating mechanism.

Like numerals refer to like parts in the several views.

For the purpose of illustration I have shown my clutch as applied to shaft transmission. For this purpose a sleeve 2 is loosely mounted upon the shaft 1, said sleeve being adapted to have a pulley fastened thereon. At one end of this sleeve is a shell 3, which may be either formed integrally therewith, or made separate and fastened thereto in the manner illustrated in Fig. 1. The shell 3 on its inside perimeter is provided with a number of ribs or fins 4, and within the shell is fitted a friction ring 5, the outer perimeter of which is notched to engage said fins, thereby providing for longitudinal motion of the ring in the shell. I may, however, form the fins on the ring and provide grooves in the shell to lock the ring and shell together; an obvious transposition of parts. The ring is preferably provided with a plurality of transverse openings in which are fitted inserts 6 of fiber, or other suitable material, said inserts projecting a slight distance beyond the surfaces of the ring at each side.

At the outside of the friction ring, is a disk 7, provided with a hub 8, which is keyed at 9 to the shaft 1. A second disk 10 is mounted to slide upon the hub 8 at the inside of the ring 5, and is coupled to the outside disk so as to rotate therewith. As herein shown the inside disk is provided with a hub grooved to fit the fins 11 on the hub 8, whereby rotative power will be transmitted from the hub 8 to both disks and thence to the friction ring, or vice versa, according to which member of the clutch is the driven and which the driving member.

To move the inside disk so as to clamp the friction ring between the two disks, I provide a plurality of bolts 12, (preferably 3 in number, in order to properly distribute the strains, although two will be sufficient in the smaller sizes of clutches), said bolts being mounted to rotate in the outer disk, and having screw threaded engagement with the inner disk. Fastened to the outward ends of these bolts are spiral gears 13, the inward faces of which engage ball bearings 15, formed on the outer face of the disk 7, in order to avoid friction at these points when setting up the clutch. Outward movement of the bolts is prevented by pins 14 inserted therethrough inside of disk 7. The spiral gears are operated by means of racks 16 fastened to a shifting sleeve 17, said racks being preferably cut from round bars, and mounted to slide in holes drilled into the hub 8. I thus provide a direct rotative connection between the bolts and the shifting sleeve, doing away entirely with intermediate links and levers and the effect of centrifugal force thereon in operating the clutch. The spiral teeth on the gears and racks are so inclined that when the sleeve is pushed to the left in Fig. 1, or toward the clutch, the bolts 12 will be rotated in the proper direction to move the disk 10 towards disk 7, thereby placing both disks in gripping engagement with the inserts on the friction ring. Owing to the difference in diameters between the spiral gears and the bolts, and to the pitch of the screw threads on said bolts, the power applied to the racks from the shifting sleeve is multiplied to such an extent that a powerful grip by the disks upon the friction ring will be produced, with comparatively small effort at the shifting sleeve. The disks are set up against the friction ring gradually, permitting some slippage before the driven member is brought up to the speed of the driving member, and preventing the too sudden starting up of the former.

By providing the friction ring with projecting inserts, the contiguous surfaces of the ring and gripping disks are spaced apart so that there can be no adherence between them, such as produced by suction, or by the surfaces becoming gummed with oil and sticking together. The inserts act to scrape the gripping surfaces clean, thereby insuring a non-slipping engagement when the disks are set up against the ring, and providing for the instant and ready release of the clutch parts when the sleeve and racks are thrown out. In setting up the clutch, it will be noticed that the spiral gears are pressed against the ball bearings during the clamping action of the bolts. Upon the release of the clutch the spiral gears are turned in the opposite direction, and as they have no particular work to do, the pins 14 are sufficient to hold the bolts against outward movement.

Various modifications in the construction of the several parts may be made without departing from the spirit of my invention; thus, the friction ring may be applied directly to the inside perimeter of a fly wheel; or may be otherwise attached to a driving or driven member. The inserts may be omitted, and the disks arranged to engage the friction ring direct; also different forms of inserts may be employed. I may also employ one or more additional rings and disks.

This clutch will be found particularly well adapted for automobile purposes, where the motor shaft is to be coupled to the transmission mechanism.

What I claim as my invention and desire to secure by Letters Patent is—

1. In a friction clutch, the combination with a friction ring, of two gripping disks positioned on opposite sides of said ring, bolts mounted to rotate on one of said disks and having screw-threaded connection with the other disk, and a shifting sleeve having direct rotative connection with said bolts to place the disks in or out of engagement with the ring 2. In a friction clutch, the combination with a friction ring, of two gripping disks positioned on opposite sides of said ring, bolts mounted to rotate on one of said disks and having screw-threaded connection with the other disk, spiral gears on said bolts, and a shifting sleeve provided with rack bars which mesh with said gears.

3. In a friction clutch, the combination, with a friction ring, of two gripping disks positioned on opposite sides of the ring, bolts mounted to rotate on one of the disks and having screw threaded connection with the other disk, spiral gears on said bolts, a hub on one of the disks adapted to be fastened upon a shaft, guideways in said hub, rack bars mounted to slide in said guideways and having diagonally cut teeth in mesh with the spiral gears, and a shifting sleeve to operate the rack bars.

4. In a friction clutch, the combination with the clutch members, of an operating mechanism comprising a longitudinally movable rack bar having diagonally cut teeth, a spiral gear in mesh with said teeth, and means operated by said gear for actuating said members 5. In a friction clutch, the combination with the clutch members, of a revoluble member adapted to actuate said members, a spiral gear on said revoluble member, and a longitudinally movable rack bar parallel to the axis of the revoluble member and having diagonally cut teeth in mesh with said gear.

In testimony whereof I have affixed my signature, in presence of two witnesses.

WM. J. HILLIARD.

Witnesses:
   JOHN M. CONNELLY,
   SAML. THORP.